(12) United States Patent
Garcia Fernandez

(10) Patent No.: US 8,291,659 B2
(45) Date of Patent: Oct. 23, 2012

(54) SUSTAINABLE BUILDING MODEL

(75) Inventor: Feliciano Garcia Fernandez, Granada (ES)

(73) Assignee: Edificios Sostenibles Getech, S.L., Granada (ES)

( * ) Notice: Subject to any disclaimer, the term of this patent is extended or adjusted under 35 U.S.C. 154(b) by 0 days.

(21) Appl. No.: 12/936,345

(22) PCT Filed: Apr. 2, 2009

(86) PCT No.: PCT/ES2009/000180
§ 371 (c)(1),
(2), (4) Date: Dec. 27, 2010

(87) PCT Pub. No.: WO2009/121990
PCT Pub. Date: Oct. 8, 2009

(65) Prior Publication Data
US 2011/0099926 A1    May 5, 2011

(30) Foreign Application Priority Data
Apr. 4, 2008    (ES) .................................. 200800952

(51) Int. Cl.
E04C 2/52    (2006.01)
E04C 1/40    (2006.01)
E04B 2/00    (2006.01)
(52) U.S. Cl. ......................... 52/220.1; 52/506.01; 52/508
(58) Field of Classification Search .................. 52/220.1, 52/506.01, 508
See application file for complete search history.

(56) References Cited

U.S. PATENT DOCUMENTS

| | | | |
|---|---|---|---|
| 2,559,871 A | 7/1957 | Gay | |
| 3,597,891 A * | 8/1971 | Martin | ............................ 52/145 |
| 4,006,856 A | 2/1977 | Nilsson | |
| 4,062,347 A * | 12/1977 | Jensen | ......................... 126/591 |
| 4,286,420 A * | 9/1981 | Pharmakidis | ................. 52/404.1 |
| 4,411,255 A * | 10/1983 | Lee | .................................. 126/618 |
| 4,433,521 A * | 2/1984 | Dietrich | ....................... 52/302.4 |
| 4,498,526 A * | 2/1985 | Arenas | ............................. 165/45 |
| 4,741,391 A | 5/1988 | Schmitz | |
| 4,856,238 A * | 8/1989 | Kesting | ......................... 52/220.2 |
| 5,347,779 A * | 9/1994 | Jordan | ......................... 52/302.3 |
| 6,220,339 B1 | 4/2001 | Krecke | |
| 6,408,582 B1 * | 6/2002 | Shim | ............................ 52/302.1 |
| 7,028,685 B1 | 4/2006 | Krecke | |
| 2009/0308566 A1* | 12/2009 | Simka | .............................. 165/45 |
| 2010/0200192 A1* | 8/2010 | Consigny | ......................... 165/45 |
| 2010/0236763 A1* | 9/2010 | Torok | ............................. 165/121 |
| 2010/0287863 A1* | 11/2010 | Goldberg et al. | ............ 52/302.1 |

FOREIGN PATENT DOCUMENTS

| | | |
|---|---|---|
| DE | 198 49 127 | 4/2000 |
| DE | 10 2005 014 189 A1 | 10/2006 |
| EP | 0 236 704 A2 | 9/1987 |
| FR | 875 411 | 9/1942 |
| FR | 2 266 121 A1 | 10/1975 |
| JP | 8-189102 A | 7/1996 |
| WO | WO 95/32397 | 11/1995 |
| WO | WO 99/47865 A1 | 9/1999 |

* cited by examiner

*Primary Examiner* — Mark Wendell
(74) *Attorney, Agent, or Firm* — Merchant & Gould P.C.

(57) ABSTRACT

The present invention relates to a novel sustainable building, the outer enclosures, roofs and foundations of which form an envelope that is formed, with the exception of doors, windows and chimneys, by a central core (5) with a high heat storage capacity, by an inner liner or membrane (4) with a high thermal conductivity and which is in close contact with the central core, and by an outer thermally insulated and mechanically resistant surface (6).

24 Claims, 7 Drawing Sheets

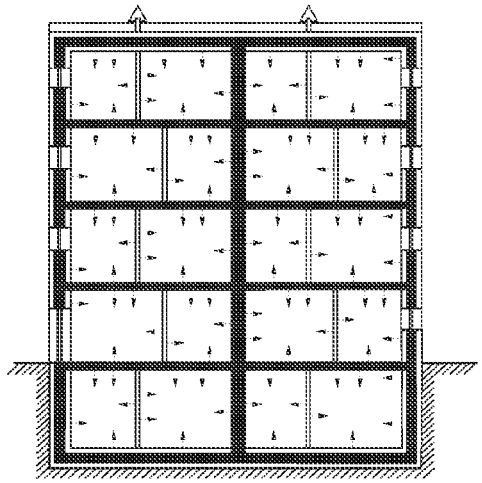
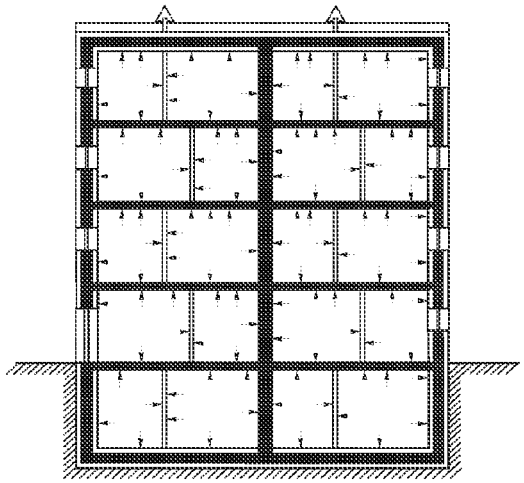
FIG. 18
FIG. 19
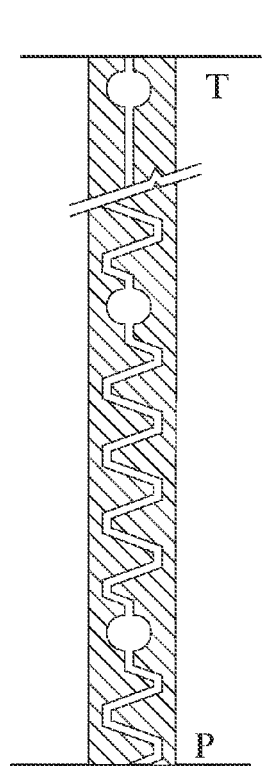
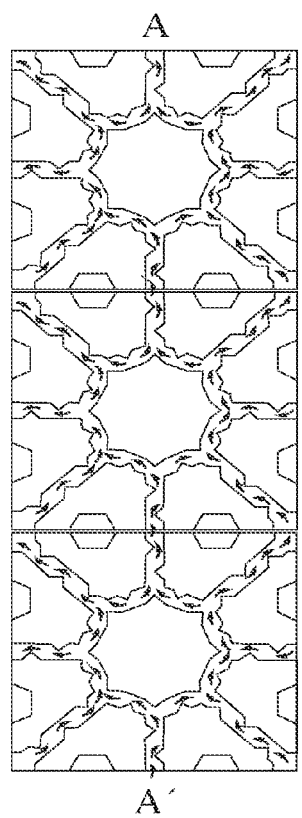
FIG. 20
FIG. 21
FIG. 22

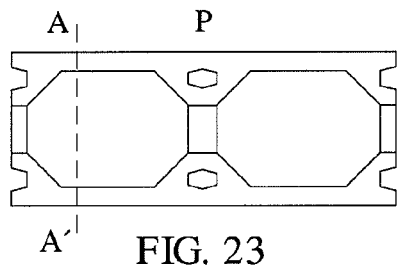
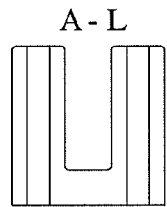
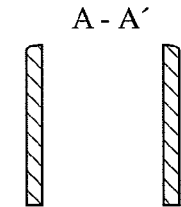
FIG. 23    FIG. 24    FIG. 25
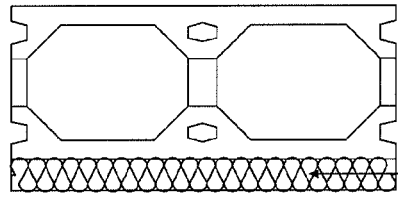
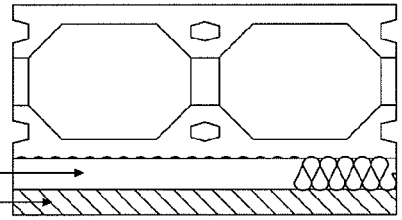
FIG. 26    FIG. 27
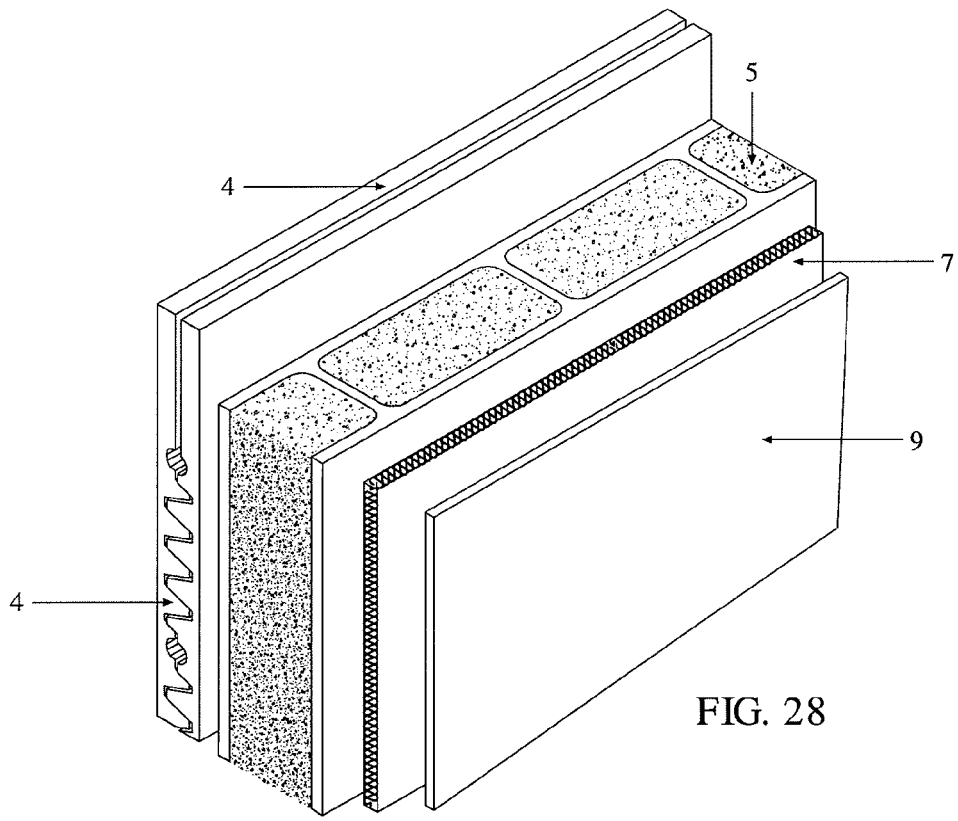
FIG. 28

SUSTAINABLE BUILDING MODEL

This application is a National Stage Application of PCT/ES2009/000180, filed 2 Apr. 2009, which claims benefit of Serial No. P200800952, filed 4 Apr. 2008 in Spain and which applications are incorporated herein by reference. To the extent appropriate, a claim of priority is made to each of the above disclosed applications.

FIELD OF THE INVENTION

The present invention relates to a novel sustainable housing or building model reducing a large percentage of the energy demand for heating and cooling thereof, the current waste of energy and harm to the health of its inhabitants and for the environment deriving from the use of current conventional technologies being eliminated, while at the same time providing the use of natural energy flows in ecosystems, as requested by the European Parliament in Resolution A3-0054/94.

The designs of sustainable buildings can vary like conventional buildings do, and even though this building basically refers to housing, which is the most important sector, this model also applies to all types of buildings, such as schools, clinics, hospitals, university buildings, offices, industrial premises, greenhouses, heat storages, etc.

BACKGROUND OF THE INVENTION

The serious looming energy crisis, the dependence on foreign energy sources of most countries, such as Spain, which has already reached 80%, the excessive consumption of homes today exceeding 40% of the total energy used by societies and the preoccupying effects caused by the change in climate, have made housing a top priority for governmental institutions, for example Directive 2002/91/EC of the EUROPEAN PARLIAMENT and COUNCIL.

If the energy demand for heating and cooling of homes is not substantially reduced without further delay, the Kyoto agreement will not be complied with and the change in climate will not be detained.

Heating and cooling of homes today are supported on two essential, complementary and mutually needed points. The first point consists of installing good thermal insulation in enclosures and roofs, while at the same time extensively using lightweight materials in partitions, noggings, roofs, and the like. Structures are thereby economized and transport and on-site installation costs are saved. Nevertheless, even by giving priority to thermal insulations, the waste of energy in homes will continue because there are other determining factors involved, as will be seen below.

The second point relates to the installation of mechanical equipment in conventional homes, generally heat pumps, which provide hot or cold air, depending on the season. However, when the operation of this equipment is stopped or brought to a halt, homes cool down or heat up in a short period of time. It is then clear that these two points or concepts complement one another and meet their objectives at the cost, however, of high energy consumption by means of permanently operating. However, since there is no economy that can resist permanent equipment consumption nor is there sufficient energy to supply them, one must ask what the purpose of thermal insulation and lightweight materials is.

What happens actually corresponds to a somewhat anarchic process in which there are several factors involved. First, like it or not, conventional homes lack air tightness, i.e. it is rather easy for outdoor air to enter and for air from the house to exit due to cracks or irregularities in the closure or the fit of doors and windows, in addition to directly opening same or chimneys and air vents in kitchens and bathrooms; there is even a number of mechanical air extractions. However, the main cause of these movements of air is the difference in pressures between the inside of the house and the outside. Therefore, the exit of a certain volume of air from the house causes a certain pressure drop in the indoor air, which causes the necessary entrance of the same volume of air from outdoors to balance the air pressure of the house with the outside atmospheric pressure. All this occurs within a set of different, changing outdoor and indoor temperatures which cause different densities, vertical movements and movements of all types, giving rise to a truly natural and permanent renewal of air in conventional houses, and although it serves a good purpose, i.e. it eliminates bad smells and provides oxygen to be breathed in, it fosters a truly wasteful energy model, since the air entering the house enters with the energy provided thereto from outdoors and the exiting air pulls out all the energy contained in the house. Therefore this is a throwaway energy model that is widespread today.

This air renewal in conventional homes is further verified in any case regardless of whether or not mechanical heating and cooling equipment is installed, which equipment frequently recycles the inside air by artificially incorporating heat or cold, but such equipment does not normally mechanically introduce outdoor air into homes except in certain installations that would enhance natural renewal of the air in the house.

Furthermore the total volume of air in a house is renewed between once and several times every hour, depending on the climate and the country. It is a widespread problem that must be solved. It is obvious that, from the point of view of physics, conventional homes have been reduced to simple containers of air, to passive spectators in an energy play in which they do not actively participate because they lack the ability to be involved therein since their materials are determined according to their thermal insulation and light weight, qualities that are not suitable for collecting and transmitting energy in the form of heat.

The described throwaway energy model is the main cause of waste in homes today. Any variants in conventional systems such as radiators or panels mean the same in the end because they need to permanently emit energy since the house barely participates in the process.

DESCRIPTION OF THE INVENTION

From the point of view of energy in the form of heat, the relations between a home and the environment are truly complex. Solving the aforementioned drawbacks is equally complex. Sustainability as such requires a long-lasting solution that respects the environment. It has to be long-lasting insofar as the current wasteful and non-renewable energy model must be eliminated and replaced with another more natural and healthier model integrated in the environment and which preferably uses natural energy flows of ecosystems, which are truly long-lasting. The greatest respect that can be given to the environment is to be integrated in it.

However, this complexity cannot be solved with a single, more or less powerful action, but rather by means of a new and no less complex organization or strategy that allows simultaneously implement a group of diverse and complementary actions.

There are five different actions from the point of view of physics, and a sixth action intended for industrialization of construction.

The first and main concept of the present invention consists of converting sustainable buildings or homes into a storage of energy in the form of heat, to which end the materials of said buildings will have a good capacity to collect heat and store it, while at the same time they will be protected by an overall envelope isolating them from the environment.

The second concept of the present invention involves the devices and manners of loading and unloading the overall energy storage.

The third concept of this invention relates to the behavior or operation of the thermal energy in the building, particularly taking into account the energy play developed in inhabitable spaces.

The fourth concept eliminates the anarchy occurring in air renewal in conventional homes, controlling the flow of air that exits and enters sustainable homes and creating a slight overpressure in the inside air.

The fifth concept relates to energy and relative humidity control treatments applied to the renewal air introduced in sustainable homes.

The sixth concept involves industrializing the construction of sustainable buildings by means of the use of prefabricated units manufactured in a workshop or industrial solutions carried out "in situ".

To that end, according to the invention the building envelope, formed by the enclosures, roofs and foundations, with the exception of doors, windows and chimneys, consists of a central core with a high heat storage capacity, an inner liner or membrane with high thermal conductivity which is in close contact with the central core, and an outer thermally insulating and mechanically resistant surface. Both the core and membrane as well as the structure, partitions and remaining elements of the building, will be conceived as a thermal storage based on the use of materials with a good heat storage capacity and the thermal insulation of the outer surface. Furthermore, according to the invention air is extracted from inside the compartments in order to suitably renew it, while at the same time an amount of air exceeding the extracted amount is driven into the compartments so as to create a slight overpressure in relation to the outside, which overpressure is sufficient to prevent the natural entrance of outside air.

It is further provided with an intelligent electronic device providing information about the inside and outside air temperatures and also the temperatures of the cores and the basement, as well as information about the pressure and relative humidity values of the indoor and outdoor air, and other climatic data about the place affecting the conditioning of the air in the building. The electronic device chooses the most appropriate energy options out of the programmed options.

The invention also provides an additional thermal energy external storage system, which can be used as heat source, comprising a heat storage, a heat collector and a liner for the heat storage which is thermally insulating, the heat storage unit being constituted by a body based on a mixture of soil and binder, together with metallic materials with high thermal conductivity. Also, the heat storage has special paths or ribs for thermal transmission which will facilitate the extraction of energy from the heat storage and its insertion therein.

The binder can consist of cement and water can be added to the body constituting the heat storage, after the binder setting.

The thermal transmission paths can consist of metallic materials, for example tubes through which a thermal fluid circulates. These tubes will be in contact with the metallic materials included in the heat storage body, to improve thermal transmission between said heat storage and the thermal transmission paths. Also, the tubes can have orifices in their wall, to serve as a means through which water is supplied to the heat storage body.

The body of soil and binder, with metallic elements, can be used to form prefabricated units which, once set, are incorporated or used in the construction of buildings.

The heat collector means can be based on solar energy harnessing systems, for example based on mirrors orientable to direct rays of sunlight to the interior of the heat storage, through an open and transparent area of the roof. The solar energy collector means can also include photovoltaic panels.

Finally, for maximum energy harnessing, according to the invention, there are means to recover the thermal energy of the air contained in the building in the process of renewal of said air. To that end, the air is extracted from the building and the air which enters coming from the outside circulates in a counterflow manner through a thermal exchanger. This exchanger can consist of two coaxial ducts which define two circulation paths, an internal one, through which the clean air coming from the outside can circulate, and an annular one, delimited between both pipes, through which the air extracted from the inside of the building will circulate. At least the wall of the internal duct will be made of a good heat conductive material, for example a metallic one, to favor thermal transmission between both air currents circulating in a counterflow manner. This transmission and thermal exchange can be improved through the arrangement, both in the internal path and in the annular path, of wings which produce turbulences in the air current.

BRIEF DESCRIPTION OF THE DRAWINGS

To better understand the present invention a set of non-limiting and simplified drawings or diagrams, not to scale, of a sustainable building with any design, height, dimension or number of floors, is provided, and certain elements that may cause confusion have been eliminated.

FIGS. 18 and 19 are views similar to FIG. 1, respectively showing the transfer and collection of heat by the enclosures, partitions and noggings, towards or away from the compartments.

FIG. 20 shows a vertical section view of a possible fluid circulation duct solution.

FIG. 21 shows a plan view of three attached panels.

FIG. 22 shows a section view of three attached panels according to section line A-A' of FIG. 21.

FIG. 23 shows a plan view of a prefabricated unit for forming the core.

FIG. 24 shows a side elevation view of the prefabricated unit of FIG. 23.

FIG. 25 shows a cross section view of the same prefabricated unit according to section line A-A' of FIG. 23.

FIGS. 26 and 27 are views similar to FIG. 23, incorporating the thermal protection and the thermal and mechanical protection, respectively.

FIG. 28 shows a perspective sectioned view of the different elements of an enclosure according to the invention.

DETAILED DESCRIPTION OF AN EMBODIMENT

Figure 1:
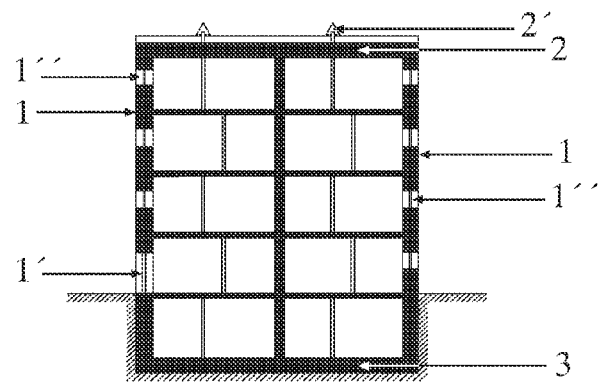
FIG. 1 is a schematic vertical section view of a building with several floors, formed according to the invention.

FIG. 1 is a schematic vertical section of the building in which several elements are seen: enclosures (1), roofs (2), flooring and foundations (3), as well as doors (1'), windows (1") and chimneys (2'), along with columns, noggings and partitions.

In order to obtain the first and main concept of this invention, i.e. converting sustainable buildings into an energy heat storage, it is necessary to first define the envelope, which is like the frame forming part of the mentioned buildings, with the exception of doors, windows and chimneys or vents, enveloping, demarcating, insulating and protecting them from both dirt and the outside environment.

Figure 2:
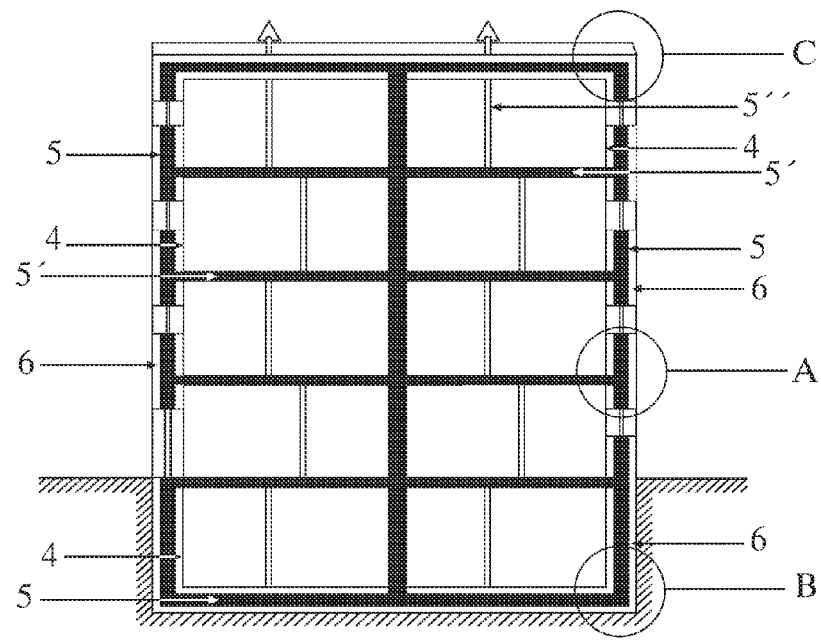
FIG. 2 is a section view similar to that of FIG. 1, to a larger scale.

FIG. 2 shows the three main parts or areas of the envelope: membrane (4), core (5) and outer surface or protection (6).

In fact, the surface forms the outer enclosures and also comprises and includes the roofs and foundations of the building. It begins in the inner surface of enclosures which is fused with the membrane (4), which firstly complies with a function of lining and protecting the core (5). This membrane will not only be a thin layer of material suited to its functions, but it can be thick and integrated in structural elements such as reinforced panels and the like which would be connected to the core and form part of same.

In any case, the membrane will have another even more important purpose, which is to collect and transmit energy in both directions. Therefore, the materials used in the membrane must be suited to their multiple functions: mortars for cement, concretes, stone, marble, etc.

The core (5) is located after the membrane (4), the core being the central and key element of the envelope. It is confined between the membrane (4) and outer surface (6). The materials forming it must have a good heating capacity in order to optimize energy storage, which is its essential purpose. Dirt, gravel, concrete and water are suitable materials, without being closed off to new incorporations.

The core can adapt different shapes and composition. Generally, taking into account the economic requirements for construction, and particularly the high price of land, less thick cores will frequently be made of concrete, even prefabricated.

Nevertheless, in low-rise housing, when the price of land is lower and especially in very harsh climates, thick solid cores can be designed, or cores formed by loose granular materials, with hollows, without mortar and capable of obtaining enormous energy storage can also be adapted.

Figure 3:
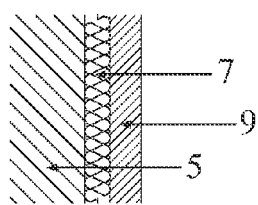
FIGS. 3, 4 and 5 correspond to details A, B and C of FIG. 2, to a larger scale.
Figure 4:
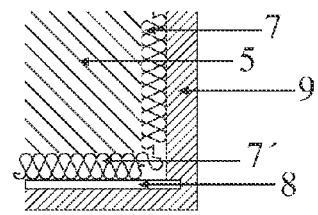
Figure 5:
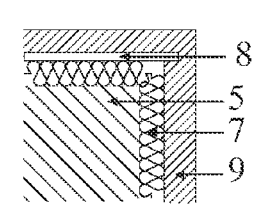

Details A, B and C of FIG. 2 are shown at a larger scale in enlarged FIGS. 3, 4 and 5, which show a suitable thermal insulation (7), in addition to waterproofing (8), especially in horizontal areas or in areas in contact with the ground, and a solid liner by way of a conventional mechanical protection (9).

Having seen the composition of the envelope, all the elements housed therein, with the exception of the outer surface (6) and the doors, windows and chimneys, will form part of the energy heat storage of the sustainable building, starting with the core, the main element of this invention. However, there are other important enveloped elements also forming the mentioned heat storage, such as the structures, noggings, partitions, foundations, flooring, stairs and the like. The energy heat storage could occasionally be expanded outside the sustainable building, creating energy pockets with materials having a good thermal capacity under foundations, streets, yards, etc. provided they are connected with other inner heat storages or with the core of the envelope.

In order for the building to become a true energy heat storage or deposit its different components with a good heating capacity will lack interposed barriers or insulations hindering the free circulation of energy inside the heat storage, such that they can easily comply with the laws of energy transmission.

It must be emphasized that the envelope internally includes the foundations or any other element of the building in contact with the ground. Although it is true that the contact of the foundation with the ground, with no insulation, could allow the evacuation of excess heat from the building towards the ground in warm periods, such contact is eliminated and a total thermal insulation (7), even a more rigid sub-foundation insulation (7'), is used to prevent transfers in cold periods, which would be unfavorable for the house; while at the same time eliminating uncontrolled energy migrations between both parts, according to the climatic season, due to Clausius' principle.

Having defined the overall energy heat storage of sustainable buildings, the devices or manners of loading it with energy or unloading such energy therefrom form the second concept of the present invention.

The main core and the small cores of the partitions of the rooms of the sustainable building become the elements where all the energy stored inside or outside the building will reach first and foremost.

Since there are no thermal insulations or barriers inside the envelope, if the cores are first and foremost loaded with energy, the remaining elements of the building capable of storing energy, such as structures, partitions, noggings, flooring, foundations, stairs, etc., will actually be loaded by conduction, radiation or convection.

The priority of the quality of the air in the building, which provides oxygen to its inhabitants, must be pointed out. To that end, in no case will outdoor air, the only air used to renew air in homes, come into contact with another fluid, not even when it is an energy carrier fluid. Therefore, loading energy into or unloading it from the core will be done by using direct internal paths that are different and independent from the paths used for the air renewal process in the homes.

Figure 7:
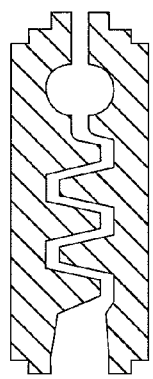
FIG. 7 is a vertical section view of the same unit, according to section line S-S' of FIG. 6.
Figure 6:
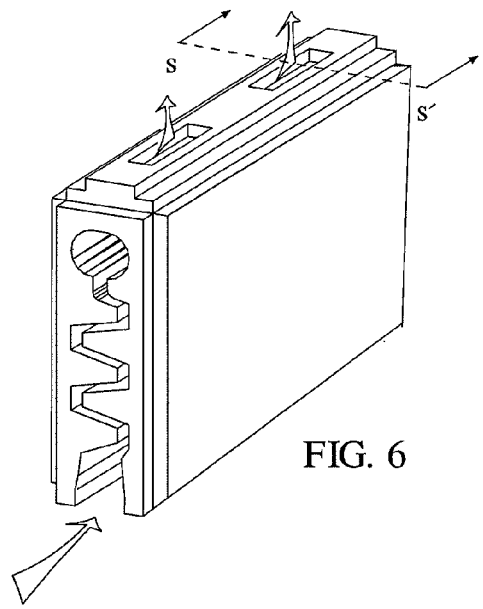
FIG. 6 is a perspective view of a prefabricated unit forming part of the outer enclosure of the building.
Figure 8:
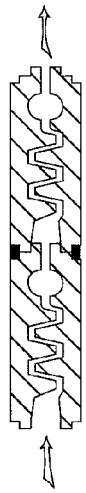
FIG. 8 shows a vertical section view of two overlaid and coupled units.
Figure 10:
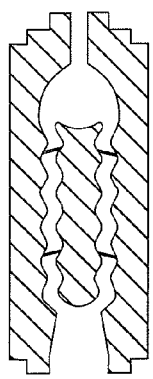
FIG. 10 is a vertical section view of the unit of FIG. 9, according to section line X-X'.
Figure 9:
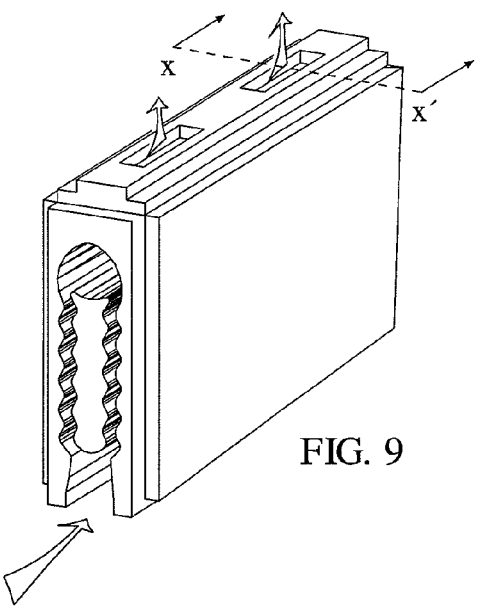
FIG. 9 is a perspective view similar to FIG. 6, showing an implementation variant.
Figure 11:
FIG. 11 shows a vertical section view of two units such as those shown in FIG. 9, overlaid and coupled together.

The most common method for loading energy into or unloading it from the core of the building is based on the use of prefabricated units, such as those shown in perspective in FIGS. 6 and 9. In both models an open crack or crevice can be seen which spans the models both horizontally and vertically, said crevice starting in the lower part, with an excessive width which allows introducing horizontal pipes or cables in its upper part, in addition to the coupling with the lower prefabricated unit for the formation of partitions. In the upper part of the crevice of each prefabricated unit, there is another hollow existing for the same purpose. FIGS. 7 and 10 show vertical sections S-S' and X-X' of the two prefabricated unit models. The open crevices for the unhindered passage of the thermal fluid can be seen in these sections. FIGS. 8 and 11 show the vertical couplings of the two prefabricated units through which the fluid passes. Finally, the prefabricated unit of FIG. 9 shows a floating thermal body, with the exception of anchors fixing it to the side faces of said prefabricated unit. Either of the two prefabricated units shown can be used indistinctly.

Figure 12:
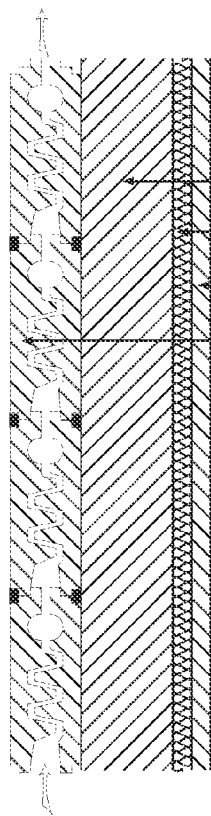
FIG. 12 shows a vertical section view of the enclosure of a building according to the invention.

FIG. 12 shows the outer enclosure of a sustainable building. The inner membrane of the closure is formed by a partition formed with any of the described prefabricated units, these partitions being attached against the core by their outer face. The other face, the inner face, is fused with the membrane of the envelope. The outer surface of the enclosure includes thermal and mechanical protections.

Figure 13:
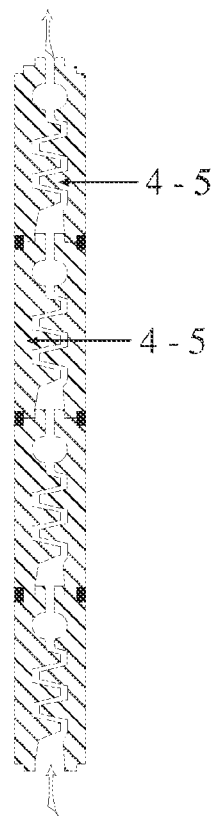
FIG. 13 shows a vertical section view of an inner partition.

The inner partitions of the homes, FIG. 13, must be constructed also using the mentioned prefabricated units, through the crevices of which units the same energy carrier fluid fed to the cores will circulate. In any case, each half of the prefabricated unit, on both sides of the crevice, will behave like a membrane and core simultaneously.

Figure 14:
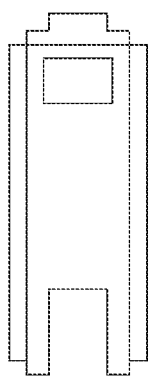
FIGS. 14 and 15 show side elevation and plan views of a prefabricated unit providing horizontal and vertical ducts.
Figure 15:
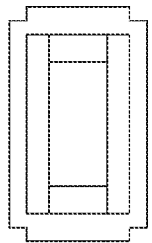

FIGS. 14 and 15 show side elevation and plan views of a prefabricated unit providing vertical ducts and which can be coupled to the previously mentioned ducts, maintaining the horizontal cavities of both.

The fluid or air must pass through the inside of the crevices being split in two main directions: a horizontal direction, aided by the flaring or cavities of each prefabricated unit, in order to obtain the horizontal movement of the air with little friction; a second predominant direction, the vertical direction, which enhances the energy exchange between the air and the two halves of the prefabricated units as a result of the turbulences caused when the rising air collides with the broken areas or abrupt changes of direction.

Figure 16:
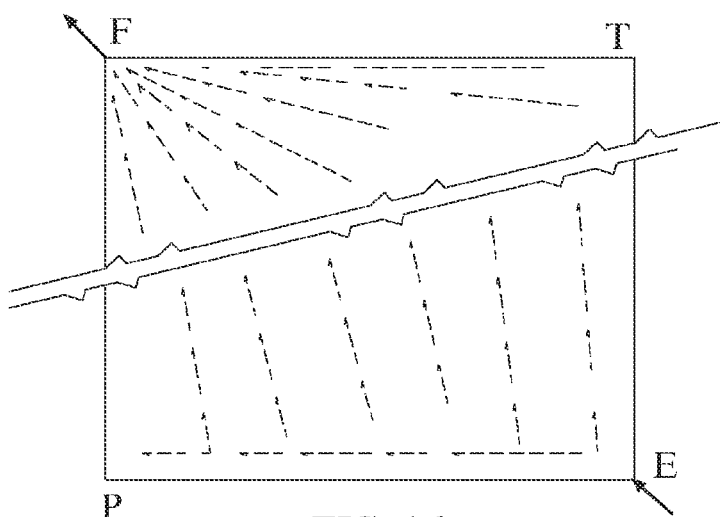
FIG. 16 schematically shows the circulation of a thermal fluid through an enclosure or partition from a lower inlet to an upper outlet.

In order to provide to the core of the enclosures energy or heat in cold periods, the necessary connections between the heat source and the lower start E of the crevices of a prefabricated unit partition, which forms part of an enclosure or forms an inner partition, FIG. 16, supported on the flooring P or ground and reaching the ceiling T or upper nogging, are first arranged.

Mechanically driving the air from the origin to coming out at the end of the crevices of the partitions would involve an unnecessary cost of energy for overcoming the load losses of the air due to friction. However, if air is extracted from the end of the course, the atmospheric pressure, which is always present at the origin of the air, will act on the air, pushing it or applying pressure to it so that it occupies the pressure drops caused by the extraction of air at the end point. It thus acts by suctioning or extracting the air mechanically from the upper opposite end F of FIG. 16, such that the inner circulation in the partition will essentially be upward, with an abundance of turbulences due to the design of the prefabricated units.

In FIG. 12, the right area of the prefabricated unit partition coming into contact with the core becomes part of such core and transfers thereto by conduction the energy received from the air. The left area of said partition will transfer its energy to the membrane by conduction and the latter to the compartments by radiation.

In order to unload the house in warm periods, FIG. 12, the fluid will be kept cold and the energy transfer phenomenon will then occur in the opposite direction. When the crevices conduct cold air, which rises by suction, the two halves of the prefabricated units of the partition and both the compartments and the cores will transfer their heat to the adjacent halves which, in turn, will transfer it to the circulating cold air.

The designs of all the prefabricated units are not limiting, being able to be modified provided that they maintain the same energy behaviors.

The extraction equipment located in F, FIG. 16, can operate continuously or intermittently with temporary shutdowns. This second intermittent system can be applied when using energy from slow reloading sources.

In long courses for the circulating fluid and due to exaggerated load losses caused by turbulences, a small ventilator can be arranged at the outside origin of the air outlet to help the atmospheric pressure drive the fluid.

In those buildings in which the core is rather thin due to the high cost of land or the height of the buildings, the scarce energy storage capacity of the core is made up for by providing energy thereto with the necessary frequency. Even in this case, the comfort and health of the system will be the same as in the cases of cores with normal thickness; even the energy savings will also be considerable insofar as the throwaway model has been eliminated.

As a general rule, to load or unload energy in a core of any design or dimension, good heat transmitting ducts or piping must be introduced inside such cores and used for the passage of energy carrier fluids.

Figure 17:
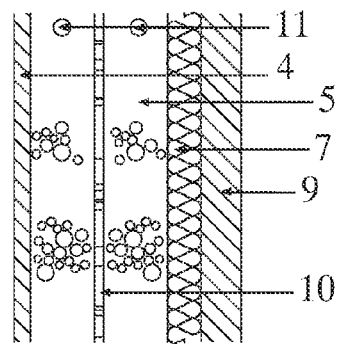
FIG. 17 shows a vertical section view of a detail of an implementation variant of an enclosure.

In the particular case of thick cores such as that of FIG. 17, formed by loose granular elements without mortar, with a good heating capacity and with hollows permeable to fluids, a hot fluid in a cold period and a cold fluid in a hot period can be passed through said hollows, piping (10, 11) with good energy transmitting walls and having open fissures or joints to allow the energy carrier fluids to exit, traverse the hollows exchanging energy with the granular elements and again enter the piping to continue their course through the inside of the core preferably being used.

In the same manner as before, not only is suction or extraction of the fluid containing energy used instead of the drive or injection therefore, but also at the described intermittence.

Even though foundations and roofs also form part of the envelope of the energy heat storage to load or unload it, the vertical elements or enclosures for locating the membranes with crevices for the circulation of an energy carrier fluid are preferably used because energy more readily accesses all the components of the heat storage from these vertical cores. Nevertheless, when the designs of sustainable buildings so require, the membranes with crevices will also be located in floorings and in ceilings or roofs.

The intelligent electronic device will be decisively involved in attaining this second concept, which device will offer permanent information, will choose the suitable energy sources and will make decisions about the starts and the temporary shutdowns of the equipment suctioning the energy flows.

The third concept of the present invention relates to the behavior of the energy stored in the building, placing a special emphasis on the energy play occurring between the compartments or rooms and the core or energy heat storage.

The general energy heat storage, both the one located inside the building and the one outside the building but connected to it, has the purpose of providing or extracting energy from the compartments with the aim of maintaining the suitable temperatures therein at all times.

Actually, any compartment of the sustainable buildings or housing is a hollow space housed inside a large energy heat storage enveloping it and all the walls of the compartment will be permeable to the passage of energy, including floors and ceilings, even though they lack the prefabricated units with crevices.

In cold periods, the heat storage or core will be kept loaded with heat. The aggression of the external environment through doors, windows or chimneys, could reduce the temperature of the compartments were it not for the involvement of the membrane, the anteroom and door of the core, which will project by radiation, FIGS. 12 and 18, energy from the heat storage onto said colder spaces, affecting the people, furniture and the opposite walls, including the air insofar as it contains greenhouse effect gases capable of trapping the infrared radiation emitted by the membranes.

In warm periods, the energy heat storage or core must be kept with reduced heat or cooled until reaching comfort level values or lower. The outside heat would affect the compartments were it not for the membranes, which will collect by radiation and convection the excess heat entering the room, and will transfer it to the cores, FIG. 19.

The use of the prefabricated units of FIGS. 6 and 9 improve and expedite the energy processes occurring between the core or heat storage and the compartments. The crevices of these prefabricated units are important elements insofar as in addition to being the channel for the circulation of the fluid loaded into or unloaded from the heat storage or core, they are traversed, by radiation, by the energy flows of said core which move towards the compartments in cold periods, and in the opposite direction, from the compartments towards the core, in warm periods.

One of the main advantages of these prefabricated units consists of the priority that is given to the compartments, which receive the energy containing the half of the prefabricated unit close to the membrane immediately, without having to wait for the core to be loaded, in cold periods. In warm periods, with the core not yet cooled, the half of the prefabricated unit close to the membrane will collect or take on the excess heat in the compartments as it is being cooled as soon as the heat storage is cooled. All the operations are coordinated from the intelligent electronic device.

In order to provide satisfactory results in energy processes and to improve the human comfort level, the membranes and cores will be permeable to water vapor, allowing the passage to the crevices of the excess relative humidity of the air of the compartments which will be absorbed by the circulating fluid.

The inhabitants of the sustainable building will notice the radiant energy projected through the walls, ceilings and floors in a pleasant, healthy and natural manner as corresponds to the emission of infrared radiation coming from the heat storage. However it is true that the air inside the building will receive certain doses of energy as a result of the friction with the walls, ceilings and floors thereof, and as a result of the infrared radiation projecting onto the spaces, which can intercept greenhouse effect molecules or the possible energy load incorporated into the renewal air, the amount of which will always be secondary in relation to that which is incorporated into the heat storage.

The fourth concept incorporated by the present invention involves eliminating the energy waste and lack of control occurring due to the renewal of air in conventional buildings or homes, controlling in the sustainable home the flow of air coming in and going out.

On one hand, it is necessary to assure minimal quality of the air that is to be breathed in, especially regarding its purity and the absence of bad smells. On the other hand, the throwaway model used in homes today must be corrected or better yet eliminated.

The sustainable buildings or homes of the present invention can also maintain these irregular paths formed by chimneys, cracks for doors and windows, although it would be appropriate to reduce them, but always preventing complete air tightness.

A control device for controlling the exit airflow rate is arranged as a first measure, strategically locating inside the home extraction points or air outlets regardless of the air exiting through the irregular paths. Other injection or supply points will simultaneously be located far from the extraction points and also inside the home. These supply points will allow introducing a greater airflow than the sum of the air that is being extracted plus the uncontrolled air of the irregular paths, so that this greater airflow maintains an overpressure or pressurization of the air inside the home that is above the outside atmospheric pressure. With this overpressure, the inside air will be forced to exit to the outside using the extraction points and the mentioned irregular paths, while at the same time preventing the anarchic entrance of the outside air, loaded with the energy taken outdoors. The different processes will be controlled and governed by the intelligent electronic device.

In order to incorporate the fifth concept, which relates to energy and control treatments for the relative humidity that will be applied to the renewal air introduced in sustainable buildings or homes, the same installations described above in relation to the fourth concept will be used, although from the point of view of physics, they are different albeit simultaneously solved concepts.

In fact, the air introduced in the homes will receive the energy contained in the air that is extracted from such homes by means of a heat exchange, without providing direct contact between the two types of air, since the outgoing air will contaminate the incoming air. The air that is introduced can previously undergo a treatment to control its relative humidity, and it can also be subjected to a thermal conditioning process, for example by exchanging energy provided by another fluid that has passed through an external heat storage.

Finally, the sixth concept relates to the industrialization of the construction of sustainable buildings or homes to lower costs and to improve precision, quality control and proper operation assurances.

Several solutions are presented: first, the aforementioned widely versatile prefabricated units (FIGS. 6, 9 and 14) from the workshop and palletized for being shipped to the construction site.

However, if larger units are required, modifications must be made to the design. To start, the entire crevice does not have to have ribs causing turbulences in the air and causing load losses. They can be eliminated in certain areas, designing another type of crevice therein that can be vertical and smooth or with little texture. FIG. 20 shows a non-limiting solution in which horizontal ducts are alternated with vertical ducts and the ribs with smooth vertical sections or relatively non-textured sections.

Upon analyzing FIGS. 12, 13 and 20, different possibilities for industrializing the construction of the crevice and its surrounding area can be deduced. The two halves of the partition containing the crevice can be manufactured in a workshop separately and then assembled on site. Or the left half could also be constructed in a factory and the other right half of the crevice could be engraved in the previously constructed core. Other solutions for obtaining the crevice are possible, such as the use of special molds which are later extracted or which are chemically dissolved after the unit has set, etc.

On special occasions either due to a lack of space or because singular designs or already constructed buildings in which technological elements of this invention are introduced are involved, the described prefabricated units housing the crevices or cracks are not possible due to their excessive thickness, therefore requiring other thinner prefabricated units but which are also capable of housing crevices or cracks that allow the passage of fluids with the formation of turbulences; these plates being constructed with the same energy transmitting materials as the previous prefabricated units.

In such circumstances, designs of prefabricated units different from those described in FIGS. 6 and 9 must be used.

Two possibilities are provided, without being limiting in nature. First, the prefabricated unit consists of a thin panel with two smooth faces, the visible face and the concealed face, which panel is attached to the walls or floors and ceilings, depending on the designs, having open channels previously engraved therein such that when the smooth plates are attached, the channels are covered to form crevices with different designs from those of the previous prefabricated units but which also allow the circulation of a fluid with turbulences. Second, the prefabricated unit will consist of a thin panel with a smooth visible face and the other concealed face containing open channels dug therein which are covered when the flat walls or floors and ceilings are attached, thus forming crevices or cracks with different designs from that of the previous prefabricated units, but which also allow the circulation of a fluid with turbulences. FIG. 21 shows a plan view of three attached panels and FIG. 22 shows a vertical section of said panels attached to a partition.

As the energy heat storage that it is, the core has a considerable weight. To that end, a hybrid, partially in a workshop and the rest on site, industrial manufacturing process is provided.

To form the core, FIG. 23 shows a plan view of a U-shaped prefabricated unit, open at the lower part, allowing its manual placement as permanent formwork, to be conveniently filled once it is installed on site. FIGS. 24 and 25 also show side elevation A-L and section A-A', respectively. This prefabricated unit allows for larger sizes, including reinforcements for aiding in their transport and placement. When the hollow spaces are filled in on site other reinforcements can also be introduced to transform the core into a structural element while at the same time being a heat storage. Other solutions complementary to this prefabricated unit can be obtained in the same manner. First, the thermal protection (7), FIG. 26, or even the two protections, thermal protection (7) and mechanical protection (9) simultaneously, FIG. 27, can be incorporated in the factory.

Regarding the thermal protection (7), aerated concretes or mortars made with natural lightweight aggregates as well as those produced in a factory, such as expanded clay and the like, must be used.

The mechanical protection (9) of FIG. 27 will be rigid in accordance with the conventional manner, using cement washes with or without reinforcements, facing brick or veneers, all weather resistant; further obtaining good adherence with the thermal insulation and both of them with the core.

FIG. 28 shows a general view of the different elements of an enclosure with considerable industrialization possibilities.

Figure 29:
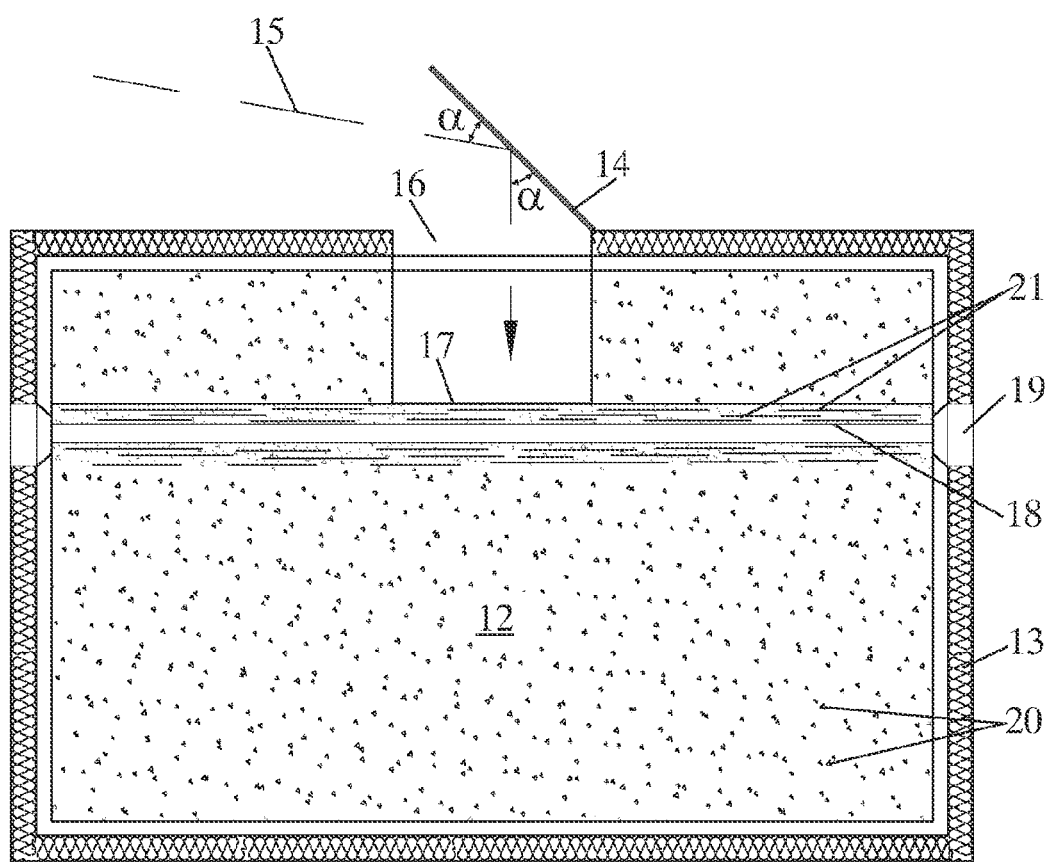
FIG. 29 shows a vertical section view of a heat storage, which can be used as a heat source.

FIG. 29 shows a thermal energy heat storage which can be used as heat source in the buildings described.

This energy heat storage is constituted based on a mixture of soil and metallic elements, water and a binder, generally cement. If the metallic elements are small pieces (20), they will be directly inserted in the concrete mixer. If they longer (21), they will be placed orientable forming part of the energy ribs. Once the body is set, water can be added. Precisely, the binder or cement prevents the breaking up of the soil due to the water.

The soil provides a high specific heat and the metallic elements increase the average conductivity of the body. The mixing water is absorbed in the setting process or discharged by the heat storage surface. Its back supply, although it does not have high conductivity, enables to remove and substitute the great number of entrapped air bubbles, which conductivity is twenty-nine times smaller than that of water.

We thus obtain a body (12) with a high specific heat and an appropriate conductivity not only to allow the heat storage loading and unloading, but also to be used in all those elements which enable it in the construction of sustainable buildings.

The heat storage energy loading and unloading is facilitated through energy ribs formed by a special body which has, besides soil, a greater percentage of cement and of appropriately orientable long metallic elements, in contact with metallic tubes which allow the passage of fluids, generally air, to facilitate said loading and unloading.

The tubes (18) can be corrugated, made of aluminum or other materials with good conductivity. Besides, these tubes can have curves in order to produce turbulences in the fluid circulating through them, to facilitate the energy transfer between the fluid and the body (12) of the heat storage. The tubes (18) can also have orifices or openings to allow the supply of water to the body (12), after the setting of the heat storage body, in order for the specific heat and conductivity to be the most appropriate in each case.

The heat storage (12) will be covered by a thermal insulating layer (13), which enables the inlet and outlet of entrapped air and water; that is, this insulating layer will be permeable to the two elements which are so necessary.

The heat storage has a direct solar energy loading device consisting of orientable mirrors (14) which will direct rays of sunlight (15) to the body (12), through an open or transparent area (16) located on the roof, being possible to have a liner (17) at the bottom of said open area (16), the liner being constituted by a metallic sheet with selective treatment, which captures the heat and transfers it to an energy artery attached for its distribution in the body (12). This type of solar collection based on using orientable mirrors can also be incorporated in roofs or terraces of sustainable buildings.

The water which is introduced in the heat storage (12), after the setting, not only increases its specific heat and conductivity, but it can also be thermally treated to provide heat or cold to the heat storage body (12), according to the season. Thus the heat storage will provide heat in winter and cold in summer.

As it was indicated before, in order to recover thermal energy from the air extracted from the buildings constructed according to the invention and which is substituted by a higher volume of air introduced from the outside, the flows of extracted or inserted air circulate in a countercurrent manner through a thermal exchanger.

Figure 30:
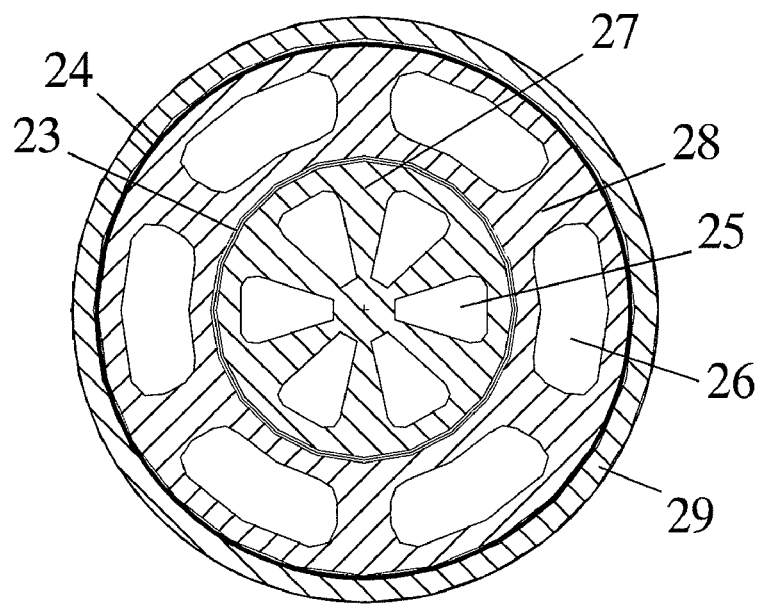
FIGS. 30 and 31 show, in transversal and longitudinal section, a tubular structure which can be used as thermal exchanger.
Figure 31:
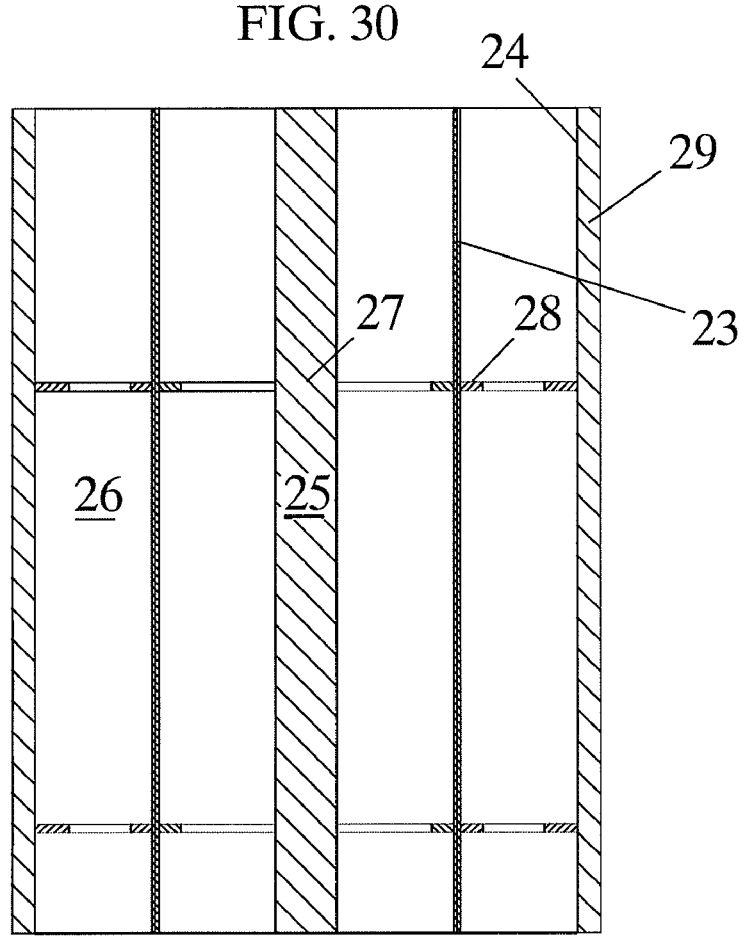

This thermal exchanger can be constituted, as shown in FIGS. 30 and 31, by two coaxial ducts (23 and 24) which delimited tow circulation paths, an internal one (25) and an annular one (26), defined between the walls (23 and 24). From these walls at least the internal one (23) will be made of a good heat conductive material, preferably metallic. Through the internal path (25) there circulates, for example, clean air inserted from the outside, while the air extracted from the inside circulates through the annular path (26). There will be a thermal exchange through the wall (23) between the two air currents. In order to maximize this thermal exchange, there can be wings (27) inside the duct (23) and also wings (28) in the annular path (26) both serving to create turbulences which will favor a thermal exchange from the air current extracted through the annular path (26) to the air current inserted through the internal path (25). The outer wall (24) can be covered by an insulating material (29).

The invention claimed is:

1. A sustainable building model, wherein said model includes outer enclosures, roofs and foundations for forming an envelope defining at least one compartment, the envelope comprising:
an outer thermally insulating and mechanically resistant surface,
a thermal heat storage comprising:
a central core with heat storage capacity;
a thermally conductive membrane in contact with the central core;
envelope partitions;
a heat collector,
a liner for thermally insulating the thermal heat storage,
a body comprising a mixture of soil and binder together with thermally conductive metallic materials, and incorporating paths for thermal transmission that facilitate extraction of energy from the thermal heat storage and insertion of energy to the thermal heat storage,
wherein air is adapted to be extracted from inside the compartment to renew the air, while at the same time an amount of air exceeding an extracted amount is driven into the compartment to create an overpressure in relation to outside pressure, the overpressure being sufficient to prevent natural entrance of outside air.

2. A sustainable building model according to claim 1, wherein the membrane of the envelope houses a crevice, walls of the crevice having ribs and directional changes for causing turbulences in a fluid circulating through said crevices.

3. A sustainable building model according to claim 2, wherein the membrane includes a partition constructed with prefabricated blocks coupled to one another and including the crevices with said ribs and changes of direction.

4. A sustainable building model according to claim 2, wherein the membrane comprises prefabricated panels in two halves coupled to one another to form the crevice with said ribs and changes of direction.

5. A sustainable building model according to claim 2, wherein the membrane includes a first element comprising channels engraved in the walls, floors or ceilings of the at least one compartment; and a second element comprising plates attached to said walls, floors or ceilings of the at least one compartment.

6. A sustainable building model according to claim 2, wherein the membrane includes a first element comprising plates with a smooth visible face, and a face containing engraved channels; and a second element comprising a smooth surface of walls, floors or ceilings of the at least one compartment on which panels are attached on the face of the engraved channels.

7. A sustainable building model according to claim 2, wherein a fluid is adapted to be circulated through the crevice by aspiration or suction, wherein fluid exchanges energy with walls of the crevice resulting from turbulences caused in the fluid by the ribs or changes of direction.

8. A sustainable building model according to claim 1, wherein ducts passing through the central core have energy transmission capacity; and an energy carrier fluid circulates within the ducts.

9. A sustainable building model according to claim 1, wherein the central core comprises granular materials with heat storage capacity and defines hollows, and the central core includes piping with open fissures and allowing energy carrier fluid to enter and exit as the energy carrier fluid flows through the central core.

10. A sustainable building model according to claim 1, wherein the central core comprises a connection including heat transmitting paths with one or more external thermal heat storages.

11. A sustainable building model according to claim 1, wherein the outer surface comprises a thermal insulating layer in contact with the central core and an outer mechanical protection layer, and intercalating waterproofing between the thermal insulating layer and the outer mechanical protection layer in a horizontal plane.

12. A sustainable building model according to claim 1, wherein the air extracted from inside the at least one compartment is subjected to heat exchange with the air that is driven into said at least one compartment through indirect contact.

13. A sustainable building model according to claim 12, wherein the air extracted from and driven into the at least one compartment is circulated in a countercurrent manner through a thermal exchanger including two coaxial ducts delimiting an inner path and an annular path, and wings creating turbulences in the air.

14. A sustainable building model according to claim 1, wherein the air driven into the at least one compartment is previously subjected to a thermal conditioning process through an external energy heat storage of a natural or renewable origin.

15. A sustainable building model according to claim 1, wherein the membrane and central core are permeable to water vapor.

16. A sustainable building model according to claim 1, further comprising an intelligent electronic device configured to optimize use of available energies, taking into account the temperatures of the core and basement, temperatures and relative humidity of indoor air and outdoor air.

17. A sustainable building model according to claim 1, wherein the binder comprises cement.

18. A sustainable building model according to claim 1, comprising water added to the body of the thermal heat storage, after the binder sets.

19. A sustainable building model according to claim 1, wherein the paths for thermal transmission comprise cement and metallic materials in an amount greater than an amount of cement and metallic materials in the body of the thermal heat storage.

20. A sustainable building model according to claim 19, wherein the body includes soil and metallic elements and binder and forms prefabricated units which once set are incorporated into the building model.

21. A sustainable building model according to claim 1, wherein the paths thermal transmission includes thermal fluid in metallic tubes.

22. A sustainable building model according to claim 21, wherein the metallic tubes comprise orifices in a wall configured to supply water through the orifices to the body of the thermal heat storage.

23. A sustainable building model according to claim 1, wherein the heat collector comprises orientable mirrors configured to direct rays of sunlight to inside of the thermal heat storage through an open and transparent area of one of the roofs.

24. A sustainable building model according to claim 23, wherein the heat collector includes photovoltaic panels.

* * * * *